United States Patent
Beaumont et al.

(10) Patent No.: US 10,104,103 B1
(45) Date of Patent: Oct. 16, 2018

(54) DATA PROCESSING SYSTEMS FOR TRACKING REPUTATIONAL RISK VIA SCANNING AND REGISTRY LOOKUP

(71) Applicant: OneTrust, LLC, Atlanta, GA (US)

(72) Inventors: Richard Beaumont, London (GB); John Mannix, London (GB)

(73) Assignee: OneTrust, LLC, Atlanta, GA (US)

( * ) Notice: Subject to any disclaimer, the term of this patent is extended or adjusted under 35 U.S.C. 154(b) by 0 days.

(21) Appl. No.: 15/875,570

(22) Filed: Jan. 19, 2018

(51) Int. Cl.
H04L 29/06 (2006.01)

(52) U.S. Cl.
CPC ...... H04L 63/1416 (2013.01); H04L 63/1433 (2013.01)

(58) Field of Classification Search
CPC .......................... H04L 63/1416; H04L 63/1433
See application file for complete search history.

(56) References Cited

U.S. PATENT DOCUMENTS

| | | | |
|---|---|---|---|
| 5,276,735 | A | 1/1994 | Boebert et al. |
| 6,253,203 | B1 | 6/2001 | OFlaherty et al. |
| 6,275,824 | B1 | 8/2001 | OFlaherty et al. |
| 6,816,944 | B2 | 11/2004 | Peng |
| 6,904,417 | B2 | 6/2005 | Clayton et al. |
| 6,925,443 | B1 | 8/2005 | Baggett, Jr. et al. |
| 7,223,234 | B2 | 5/2007 | Stupp et al. |
| 7,234,065 | B2 | 6/2007 | Breslin et al. |
| 7,251,624 | B1 | 7/2007 | Lee et al. |
| 7,260,830 | B2 | 8/2007 | Sugimoto |
| 7,287,280 | B2 | 10/2007 | Young |
| 7,478,157 | B2 | 1/2009 | Bohrer et al. |
| 7,548,968 | B1 * | 6/2009 | Bura ...................... G06F 21/604 709/206 |
| 7,603,356 | B2 | 10/2009 | Schran et al. |
| 7,729,940 | B2 | 6/2010 | Harvey et al. |

(Continued)

FOREIGN PATENT DOCUMENTS

WO   2015116905   8/2015

OTHER PUBLICATIONS

Notice of Allowance, dated Mar. 1, 2018, from corresponding U.S. Appl. No. 15/853,674.

(Continued)

*Primary Examiner* — Darren B Schwartz
(74) *Attorney, Agent, or Firm* — Brient IP Law, LLC; Scott E. Brient; Alfred Steven Nugent, IV (57) ABSTRACT

A domain scanning and website analysis system may be utilized to determine whether an entity is registering one or more websites maliciously in the name of a particular organization (e.g., or using a particular brand name, trademark, or other protected name of the organization). The system may be configured to: (1) scan a plurality of web domains to identify a particular name or variation thereof; (2) perform a registry lookup for any identified web domains that include the particular name; (3) determine based on registration information determined from the registry lookup, whether the identified domain or sub-domain is registered to a potentially malicious entity; (4) scan one or more webpages in the identified domain to determine content; and (5) determine, based on the determined content and whether the web domain is registered to a potentially malicious entity, whether to take action against the identified domain or sub-domain.

19 Claims, 5 Drawing Sheets

(56) References Cited

U.S. PATENT DOCUMENTS

| | | | |
|---|---|---|---|
| 7,788,632 B2 | 8/2010 | Kuester et al. | |
| 7,801,758 B2 | 9/2010 | Gracie et al. | |
| 7,853,468 B2 | 12/2010 | Callahan et al. | |
| 7,877,812 B2 | 1/2011 | Koved et al. | |
| 7,885,841 B2 | 2/2011 | King | |
| 7,966,663 B2 | 6/2011 | Strickland et al. | |
| 7,991,559 B2 | 8/2011 | Dzekunov et al. | |
| 8,019,881 B2 | 9/2011 | Sandhu et al. | |
| 8,146,074 B2 | 3/2012 | Ito et al. | |
| 8,156,158 B2 | 4/2012 | Rolls et al. | |
| 8,176,334 B2 | 5/2012 | Vainstein | |
| 8,286,239 B1* | 10/2012 | Sutton | H04L 63/0227 726/22 |
| 8,504,481 B2 | 8/2013 | Motahari et al. | |
| 8,578,036 B1 | 11/2013 | Holfelder et al. | |
| 8,583,694 B2 | 11/2013 | Siegel et al. | |
| 8,601,591 B2 | 12/2013 | Krishnamurthy et al. | |
| 8,606,746 B2 | 12/2013 | Yeap et al. | |
| 8,612,420 B2 | 12/2013 | Sun et al. | |
| 8,612,993 B2 | 12/2013 | Grant et al. | |
| 8,683,502 B2 | 3/2014 | Shkedi et al. | |
| 8,712,813 B2 | 4/2014 | King | |
| 8,805,707 B2 | 8/2014 | Schumann, Jr. et al. | |
| 8,805,925 B2 | 8/2014 | Price et al. | |
| 8,812,342 B2 | 8/2014 | Barcelo et al. | |
| 8,819,253 B2 | 8/2014 | Simeloff et al. | |
| 8,826,446 B1 | 9/2014 | Liu et al. | |
| 8,893,286 B1* | 11/2014 | Oliver | G06F 21/64 726/22 |
| 8,914,299 B2 | 12/2014 | Pesci-Anderson | |
| 8,943,076 B2 | 1/2015 | Stewart et al. | |
| 8,966,575 B2 | 2/2015 | McQuay et al. | |
| 8,990,933 B1* | 3/2015 | Magdalin | H04L 63/1483 709/229 |
| 8,997,213 B2 | 3/2015 | Papakipos et al. | |
| 9,092,796 B2 | 7/2015 | Eversoll et al. | |
| 9,094,434 B2 | 7/2015 | Williams et al. | |
| 9,152,820 B1 | 10/2015 | Pauley, Jr. et al. | |
| 9,158,655 B2 | 10/2015 | Wadhwani et al. | |
| 9,172,706 B2 | 10/2015 | Krishnamurthy et al. | |
| 9,202,085 B2 | 12/2015 | Mawdsley et al. | |
| 9,215,252 B2 | 12/2015 | Smith et al. | |
| 9,288,118 B1 | 3/2016 | Pattan | |
| 9,338,188 B1 | 5/2016 | Ahn | |
| 9,348,802 B2 | 5/2016 | Massand | |
| 9,384,357 B2 | 7/2016 | Patil et al. | |
| 9,386,104 B2 | 7/2016 | Adams et al. | |
| 9,401,900 B2 | 7/2016 | Levasseur et al. | |
| 9,424,021 B2 | 8/2016 | Zamir | |
| 9,462,009 B1* | 10/2016 | Kolman | H04L 63/1425 |
| 9,465,800 B2 | 10/2016 | Lacey | |
| 9,477,660 B2 | 10/2016 | Scott et al. | |
| 9,507,960 B2 | 11/2016 | Bell et al. | |
| 9,521,166 B2 | 12/2016 | Wilson | |
| 9,602,529 B2 | 3/2017 | Jones et al. | |
| 9,646,095 B1 | 5/2017 | Gottlieb et al. | |
| 9,652,314 B2 | 5/2017 | Mahiddini | |
| 9,654,541 B1 | 5/2017 | Kapczynski et al. | |
| 9,691,090 B1 | 6/2017 | Barday | |
| 9,721,108 B2 | 8/2017 | Krishnamurthy et al. | |
| 9,729,583 B1 | 8/2017 | Barday | |
| 9,838,407 B1* | 12/2017 | Oprea | H04L 63/1416 |
| 9,892,441 B2 | 2/2018 | Barday | |
| 9,892,442 B2 | 2/2018 | Barday | |
| 9,892,443 B2 | 2/2018 | Barday | |
| 9,892,444 B2 | 2/2018 | Barday | |
| 9,898,769 B2 | 2/2018 | Barday | |
| 2002/0161594 A1 | 10/2002 | Bryan et al. | |
| 2003/0041250 A1 | 2/2003 | Proudler | |
| 2006/0068755 A1* | 3/2006 | Shraim | H04L 51/12 455/410 |
| 2006/0075122 A1 | 4/2006 | Lindskog et al. | |
| 2006/0112066 A1* | 5/2006 | Hamzy | G06F 17/273 |
| 2006/0112094 A1* | 5/2006 | Sullivan | G06F 17/30887 |
| 2006/0123485 A1* | 6/2006 | Williams | G06F 21/10 726/27 |
| 2007/0027715 A1 | 2/2007 | Gropper et al. | |
| 2007/0157311 A1 | 7/2007 | Meier et al. | |
| 2007/0266420 A1 | 11/2007 | Hawkins et al. | |
| 2007/0283171 A1 | 12/2007 | Breslin et al. | |
| 2008/0015927 A1 | 1/2008 | Ramirez | |
| 2008/0028435 A1 | 1/2008 | Strickland et al. | |
| 2008/0092242 A1* | 4/2008 | Rowley | H04L 63/1483 726/27 |
| 2008/0120699 A1* | 5/2008 | Spear | H04L 63/10 726/4 |
| 2008/0250159 A1* | 10/2008 | Wang | G06F 21/6218 709/239 |
| 2008/0270203 A1* | 10/2008 | Holmes | G06Q 10/04 705/7.28 |
| 2009/0037975 A1* | 2/2009 | Ishikawa | G06F 21/105 726/1 |
| 2009/0077383 A1* | 3/2009 | de Monseignat | H04L 63/0823 713/175 |
| 2009/0144325 A1* | 6/2009 | Chastagnol | G06Q 30/06 |
| 2009/0182818 A1* | 7/2009 | Krywaniuk | H04L 51/12 709/206 |
| 2009/0204452 A1 | 8/2009 | Iskandar et al. | |
| 2010/0121773 A1 | 5/2010 | Currier et al. | |
| 2010/0205057 A1 | 8/2010 | Hook et al. | |
| 2010/0235915 A1* | 9/2010 | Memon | H04L 63/145 726/23 |
| 2010/0268628 A1* | 10/2010 | Pitkow | G06F 21/10 705/34 |
| 2010/0333012 A1 | 12/2010 | Adachi et al. | |
| 2011/0010202 A1 | 1/2011 | Neale | |
| 2011/0167474 A1* | 7/2011 | Sinha | G06F 21/51 726/1 |
| 2011/0231896 A1* | 9/2011 | Tovar | H04L 29/12066 726/1 |
| 2012/0084349 A1 | 4/2012 | Lee et al. | |
| 2012/0102543 A1 | 4/2012 | Kohli et al. | |
| 2012/0110674 A1 | 5/2012 | Belani et al. | |
| 2012/0116923 A1 | 5/2012 | Irving et al. | |
| 2012/0143650 A1* | 6/2012 | Crowley | G06F 21/554 705/7.28 |
| 2012/0144499 A1* | 6/2012 | Tan | G06Q 10/00 726/26 |
| 2012/0233698 A1* | 9/2012 | Watters | G06F 21/554 726/25 |
| 2012/0259752 A1 | 10/2012 | Agee | |
| 2013/0218829 A1 | 8/2013 | Martinez | |
| 2013/0311224 A1 | 11/2013 | Heroux et al. | |
| 2013/0332362 A1 | 12/2013 | Ciurea | |
| 2013/0340086 A1 | 12/2013 | Blom | |
| 2014/0006616 A1 | 1/2014 | Aad et al. | |
| 2014/0012833 A1 | 1/2014 | Humprecht | |
| 2014/0032265 A1 | 1/2014 | Paprocki | |
| 2014/0040134 A1 | 2/2014 | Ciurea | |
| 2014/0047551 A1 | 2/2014 | Nagasundaram et al. | |
| 2014/0089039 A1 | 3/2014 | McClellan | |
| 2014/0208418 A1 | 7/2014 | Libin | |
| 2014/0278663 A1 | 9/2014 | Samuel et al. | |
| 2014/0283027 A1 | 9/2014 | Orona et al. | |
| 2014/0283106 A1* | 9/2014 | Stahura | G06Q 10/06 726/27 |
| 2014/0289862 A1* | 9/2014 | Gorfein | G06F 21/10 726/26 |
| 2014/0298460 A1* | 10/2014 | Xue | H04L 63/1425 726/23 |
| 2014/0337466 A1 | 11/2014 | Li et al. | |
| 2014/0344015 A1 | 11/2014 | Puértolas-Montañés et al. | |
| 2014/0359760 A1* | 12/2014 | Gupta | H04L 63/1408 726/22 |
| 2015/0066577 A1 | 3/2015 | Christiansen et al. | |
| 2015/0106867 A1* | 4/2015 | Liang | H04L 63/1433 726/1 |
| 2015/0106948 A1 | 4/2015 | Holman et al. | |
| 2015/0106949 A1 | 4/2015 | Holman et al. | |
| 2015/0169318 A1 | 6/2015 | Nash | |
| 2015/0229664 A1 | 8/2015 | Hawthorn et al. | |

(56) References Cited

U.S. PATENT DOCUMENTS

| | | | |
|---|---|---|---|
| 2015/0242778 | A1 | 8/2015 | Wilcox et al. |
| 2015/0262193 | A1* | 9/2015 | Carvalho ............ G06Q 30/0185 705/318 |
| 2015/0269384 | A1 | 9/2015 | Holman et al. |
| 2015/0356362 | A1 | 12/2015 | Demos |
| 2016/0048700 | A1 | 2/2016 | Stransky-Heilkron |
| 2016/0099963 | A1 | 4/2016 | Mahaffey et al. |
| 2016/0162269 | A1 | 6/2016 | Pogorelik et al. |
| 2016/0234319 | A1 | 8/2016 | Griffin |
| 2016/0321748 | A1 | 11/2016 | Mahatma et al. |
| 2016/0330237 | A1 | 11/2016 | Edlabadkar |
| 2016/0364736 | A1 | 12/2016 | Maugans, III |
| 2016/0381064 | A1* | 12/2016 | Chan ..................... H04L 63/104 726/25 |
| 2016/0381560 | A1 | 12/2016 | Margaliot |
| 2017/0078322 | A1* | 3/2017 | Seiver ................. H04L 43/0876 |
| 2017/0142158 | A1 | 5/2017 | Laoutaris et al. |
| 2017/0161520 | A1 | 6/2017 | Lockhart, III et al. |
| 2017/0171235 | A1* | 6/2017 | Mulchandani ...... H04L 63/1425 |
| 2017/0177324 | A1 | 6/2017 | Frank et al. |
| 2017/0180505 | A1 | 6/2017 | Shaw et al. |
| 2017/0193624 | A1 | 7/2017 | Tsai |
| 2017/0206707 | A1 | 7/2017 | Guay et al. |
| 2017/0220964 | A1* | 8/2017 | Datta Ray .......... G06Q 10/0635 |
| 2017/0249710 | A1 | 8/2017 | Guillama et al. |
| 2017/0270318 | A1 | 9/2017 | Ritchie |
| 2017/0286719 | A1 | 10/2017 | Krishnamurthy et al. |
| 2017/0330197 | A1 | 11/2017 | DiMaggio et al. |
| 2018/0063174 | A1* | 3/2018 | Grill .................... H04L 63/1425 |
| 2018/0063190 | A1* | 3/2018 | Wright ................ H04L 63/1416 |
| 2018/0091476 | A1* | 3/2018 | Jakobsson ........... H04L 63/1433 |

OTHER PUBLICATIONS

Notice of Allowance, dated Mar. 2, 2018, from corresponding U.S. Appl. No. 15/858,802.
Avepoint, Automating Privacy Impact Assessments, AvePoint, Inc., 2005.
Avepoint, AvePoint Privacy Impact Assessment 1: User Guide, Cumulative Update 2, Revision E, Feb. 2015, AvePoint, Inc.
Avepoint, Installing and Configuring the APIA System, International Association of Privacy Professionals, AvePoint, Inc., 2005.
Dwork, Cynthia, Differential Privacy, Microsoft Research, p. 1-12, Jul. 1 2006.
Enck, William, et al, TaintDroid: An Information-Flow Tracking System for Realtime Privacy Monitoring on Smartphones, ACM Transactions on Computer Systems, vol. 32, No. 2, Article 5, Jun. 2014, p. 5:1-5:29.
Francis, Andre, Business Mathematics and Statistics, South-Western Cengage Learning, 2008, Sixth Edition.
Frikken, Keith B., et al, Yet Another Privacy Metric for Publishing Micro-data, Miami University, Oct. 27, 2008, p. 117-121.
Hunton & Williams LLP, The Role of Risk Management in Data Protection, Privacy Risk Framework and the Risk-based Approach to Privacy, Centre for Information Policy Leadership, Workshop II, Nov. 23, 2014.
IAPP, Daily Dashboard, PIA Tool Stocked With New Templates for DPI, Infosec, International Association of Privacy Professionals, Apr. 22, 2014.
IAPP, ISO/IEC 27001 Information Security Management Template, Resource Center, International Association of Privacy Professionals, 2013.
Li, Ninghui, et al, t-Closeness: Privacy Beyond k-Anonymity and l-Diversity, IEEE, 2014, p. 106-115.
Office Action, dated Apr. 18, 2018, from corresponding U.S. Appl. No. 15/894,819.
Office Action, dated Mar. 30, 2018, from corresponding U.S. Appl. No. 15/894,890.
Office Action, dated Mar. 30, 2018, from corresponding U.S. Appl. No. 15/896,790.
Pfeifle, Sam, The Privacy Advisor, IAPP and AvePoint Launch New Free PIA Tool, International Association of Privacy Professionals, Mar. 5, 2014.
Pfeifle, Sam, The Privacy Advisor, IAPP Heads to Singapore with APIA Template in Tow, International Association of Privacy Professionals, https://iapp.org/news/a/iapp-heads-to-singapore-with-apia-templatein_tow/, Mar. 28, 2014, p. 1-3.
Schwartz, Edward J., et al, 2010 IEEE Symposium on Security and Privacy: All You Ever Wanted to Know About Dynamic Analysis and forward Symbolic Execution (but might have been afraid to ask), Carnegie Mellon University, IEEE Computer Society, 2010, p. 317-331.
Zeldovich, Nickolai, et al, Making Information Flow Explicit in HiStar, OSDI '06: 7th USENIX Symposium on Operating Systems Design and Implementation, USENIX Association, p. 263-278.
Office Action, dated Sep. 19, 2017, from corresponding U.S. Appl. No. 15/671,073.
Office Action, dated Sep. 22, 2017, from corresponding U.S. Appl. No. 15/619,278.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Restriction Requirement, dated Jan. 18, 2017, from corresponding U.S. Appl. No. 15/256,430.
Restriction Requirement, dated Jul. 28, 2017, from corresponding U.S. Appl. No. 15/169,658.
Restriction Requirement, dated Nov. 21, 2016, from corresponding U.S. Appl. No. 15/254,901.
Symantec, Symantex Data Loss Prevention—Discover, monitor, and protect confidential data; 2008; Symantec corporation; http://www.mssuk.com/images/Symantec%2014552315_IRC_BR_DLP_03_09_sngl.pdf.
TRUSTe Announces General Availability of Assessment Manager for Enterprises to Streamline Data Privacy Management with Automation, PRNewswire, Mar. 4, 2015.
Written Opinion of the International Searching Authority, dated Jun. 6, 2017, from corresponding International Application No. PCT/US2017/025611.
Written Opinion of the International Searching Authority, dated Aug. 15, 2017, from corresponding International Application No. PCT/US2017/036919.
Written Opinion of the International Searching Authority, dated Aug. 21, 2017, from corresponding International Application No. PCT/US2017/036914.
Written Opinion of the International Searching Authority, dated Aug. 29, 2017, from corresponding International Application No. PCT/US2017/036898.
Written Opinion of the International Searching Authority, dated Aug. 8, 2017, from corresponding International Application No. PCT/US2017/036889.
Written Opinion of the International Searching Authority, dated Aug. 8, 2017, from corresponding International Application No. PCT/US2017/036890.
Written Opinion of the International Searching Authority, dated Aug. 8, 2017, from corresponding International Application No. PCT/US2017/036893.
Written Opinion of the International Searching Authority, dated Aug. 8, 2017, from corresponding International Application No. PCT/US2017/036901.
Written Opinion of the International Searching Authority, dated Aug. 8, 2017, from corresponding International Application No. PCT/US2017/036913.
Written Opinion of the International Searching Authority, dated Aug. 8, 2017, from corresponding International Application No. PCT/US2017/036920.
Written Opinion of the International Searching Authority, dated Jun. 21, 2017, from corresponding International Application No. PCT/US2017/025600.

(56) References Cited

OTHER PUBLICATIONS

Written Opinion of the International Searching Authority, dated Jun. 6, 2017, from corresponding International Application No. PCT/US2017/025605.
Written Opinion of the International Searching Authority, dated Oct. 12, 2017, from corresponding International Application No. PCT/US2017/036888.
Written Opinion of the International Searching Authority, dated Oct. 20, 2017, from corresponding International Application No. PCT/US2017/036917.
Written Opinion of the International Searching Authority, dated Oct. 3, 2017, from corresponding International Application No. PCT/US2017/036912.
Written Opinion of the International Searching Authority, dated Sep. 1, 2017, from corresponding International Application No. PCT/US2017/036896.
www.truste.com (1), 200150207, Internet Archive Wayback Machine, www.archive.org,2_7_2015.
Final Office Action, dated Jan. 17, 2018, from corresponding U.S. Appl. No. 15/619,278.
Final Office Action, dated Jan. 23, 2018, from corresponding U.S. Appl. No. 15/619,479.
Final Office Action, dated Nov. 29, 2017, from corresponding U.S. Appl. No. 15/619,237.
Ghiglieri, Marco et al.; Personal DLP for Facebook, 2014 IEEE International Conference on Pervasive Computing and Communication Workshops (Percom Workshops); IEEE; Mar. 24, 2014; pp. 629-634.
International Search Report, dated Aug. 15, 2017, from corresponding International Application No. PCT/US2017/036919.
International Search Report, dated Aug. 21, 2017, from corresponding International Application No. PCT/US2017/036914.
International Search Report, dated Aug. 29, 2017, from corresponding International Application No. PCT/US2017/036898.
International Search Report, dated Aug. 8, 2017, from corresponding International Application No. PCT/US2017/036889.
International Search Report, dated Aug. 8, 2017, from corresponding International Application No. PCT/US2017/036890.
International Search Report, dated Aug. 8, 2017, from corresponding International Application No. PCT/US2017/036893.
International Search Report, dated Aug. 8, 2017, from corresponding International Application No. PCT/US2017/036901.
International Search Report, dated Aug. 8, 2017, from corresponding International Application No. PCT/US2017/036913.
International Search Report, dated Aug. 8, 2017, from corresponding International Application No. PCT/US2017/036920.
International Search Report, dated Jun. 21, 2017, from corresponding International Application No. PCT/US2017/025600.
International Search Report, dated Jun. 6, 2017, from corresponding International Application No. PCT/US2017/025605.
International Search Report, dated Jun. 6, 2017, from corresponding International Application No. PCT/US2017/025611.
International Search Report, dated Oct. 12, 2017, from corresponding International Application No. PCT/US2017/036888.
International Search Report, dated Oct. 20, 2017, from corresponding International Application No. PCT/US2017/036917.
International Search Report, dated Oct. 3, 2017, from corresponding International Application No. PCT/US2017/036912.
International Search Report, dated Sep. 1, 2017, from corresponding International Application No. PCT/US2017/036896.
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017/036917.
Invitation to Pay Additional Search Fees, dated Aug. 24, 2017, from corresponding International Application No. PCT/US2017/036888.
Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.
Notice of Allowance, dated Apr. 12, 2017, from corresponding U.S. Appl. No. 15/256,419.
Notice of Allowance, dated Aug. 18, 2017, from corresponding U.S. Appl. No. 15/619,455.
Notice of Allowance, dated Dec. 12, 2017, from corresponding U.S. Appl. No. 15/169,643.
Notice of Allowance, dated Dec. 12, 2017, from corresponding U.S. Appl. No. 15/619,212.
Notice of Allowance, dated Dec. 12, 2017, from corresponding U.S. Appl. No. 15/619,382.
Notice of Allowance, dated Dec. 5, 2017, from corresponding U.S. Appl. No. 15/633,703.
Notice of Allowance, dated Dec. 6, 2017, from corresponding U.S. Appl. No. 15/619,451.
Notice of Allowance, dated Dec. 6, 2017, from corresponding U.S. Appl. No. 15/619,459.
Notice of Allowance, dated Jan. 18, 2018, from corresponding U.S. Appl. No. 15/619,478.
Notice of Allowance, dated Jan. 23, 2018, from corresponding U.S. Appl. No. 15/619,251.
Notice of Allowance, dated Jan. 26, 2018, from corresponding U.S. Appl. No. 15/619,469.
Notice of Allowance, dated May 5, 2017, from corresponding U.S. Appl. No. 15/254,901.
Notice of Allowance, dated Nov. 7, 2017, from corresponding U.S. Appl. No. 15/671,073.
Notice of Allowance, dated Sep. 27, 2017, from corresponding U.S. Appl. No. 15/626,052.
Office Action, dated Aug. 23, 2017, from corresponding U.S. Appl. No. 15/626,052.
Office Action, dated Aug. 24, 2017, from corresponding U.S. Appl. No. 15/169,643.
Office Action, dated Aug. 24, 2017, from corresponding U.S. Appl. No. 15/619,451.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Office Action, dated Dec. 15, 2016, from corresponding U.S. Appl. No. 15/256,419.
Office Action, dated Jul. 21, 2017, from corresponding U.S. Appl. No. 15/256,430.
Office Action, dated Nov. 1, 2017, from corresponding U.S. Appl. No. 15/169,658.
Office Action, dated Sep. 1, 2017, from corresponding U.S. Appl. No. 15/619,459.
Office Action, dated Sep. 11, 2017, from corresponding U.S. Appl. No. 15/619,375.
Office Action, dated Sep. 11, 2017, from corresponding U.S. Appl. No. 15/619,478.
Notice of Allowance, dated Apr. 25, 2018, from corresponding U.S. Appl. No. 15/883,041.
Office Action, dated May 2, 2018, from corresponding U.S. Appl. No. 15/894,809.
Office Action, dated May 16, 2018, from corresponding U.S. Appl. No. 15/882,989.
Notice of Allowance, dated May 21, 2018, from corresponding U.S. Appl. No. 15/896,790.
Notice of Allowance, dated Jun. 19, 2018, from corresponding U.S. Appl. No. 15/894,890.
Notice of Allowance, dated Jun. 27, 2018, from corresponding U.S. Appl. No. 15/882,989.
Notice of Allowance, dated Aug. 9, 2018, from corresponding U.S. Appl. No. 15/882,989.
Notice of Allowance, dated Aug. 14, 2018, from corresponding U.S. Appl. No. 15/989,416.
Notice of Allowance, dated Aug. 24, 2018, from corresponding U.S. Appl. No. 15/619,479.

\* cited by examiner

DATA PROCESSING SYSTEMS FOR TRACKING REPUTATIONAL RISK VIA SCANNING AND REGISTRY LOOKUP

BACKGROUND

Companies may desire to prevent competitors and others from exploiting their name in web domains to drive web traffic. It may be difficult to monitor for such exploitation as a result of increasing number of top level domain registrations. Accordingly, there is a need for systems and methods to address these desires in light of such difficulties.

SUMMARY

A computer-implemented data processing method for scanning and analyzing a plurality of web domains (e.g., including both top-level domains and subdomains), according to various embodiments, comprises: (1) identifying, by one or more processors, a first entity; (2) determining, by one or more processors, one or more terms associated with the first entity; (3) scanning, by one or more processors, a plurality of web domains to determine whether the plurality of web domains contain one or more domains related to the one or more terms; (4) in response to determining that the plurality of web domains contain one or more domains related to the one or more terms, performing, by one or more processors, a registry lookup for the one or more domains to retrieve registry information for each of the one or more domains; (5) determining, by one or more processors, based at least in part on the registry information, whether each of the one or more domains are associated with the first entity; (6) in response to determining that a particular domain of the one or more domains is associated with a second entity, analyzing, by one or more processors, one or more webpages within the particular domain to determine a level of risk posed by the particular domain to the first entity; (7) determining, by one or more processors, whether the level of risk exceeds a threshold level of risk; and (8) in response to determining that the level of risk exceeds a threshold level of risk, substantially automatically taking, by one or more processors, a predefined action.

A computer-implemented data-processing method of analyzing a risk level of a particular web domain, in particular embodiments, comprises: (1) identifying, by one or more processors, a first entity; (2) determining, by one or more processors, one or more terms associated with the first entity; (3) performing a first scan, by one or more processors, of a plurality of web domains to identify a particular web domain of the plurality of web domains that comprises the one or more terms; (4) in response to identifying the particular domain, performing, by one or more processors, a registry lookup for the particular domain to determine a registrant of the particular domain; (5) determining, by one or more processors, based at least in part on the registry information, whether the registrant is associated with the first entity; (6) analyzing, by one or more processors, one or more pieces of content on one or more webpages within the particular web domain; (7) determining, by one or more processors, based at least in part on whether the registrant is associated with the first entity and the analyzed one or more pieces of content, a level of risk posed by the particular web domain to the first entity; (8) determining, by one or more processors, whether the level of risk exceeds a threshold level of risk; and (9) in response to determining that the level of risk exceeds a threshold level of risk, substantially automatically taking, by one or more processors, a predefined action.

A computer-implemented data-processing method of analyzing a risk level of a particular web domain to a first entity, according to some embodiments, includes analyzing registry data for the web domain and content of one or more webpages hosted on the web domain. In particular embodiments, the method comprises: (1) determining, by one or more processors, one or more terms associated with the first entity; (2) determining, by one or more processors, one or more common misspellings of the one or more terms; (3) scanning, by one or more processors, a plurality of web domains to identify a particular web domain of the plurality of web domains that comprises the one or more terms or the one or more common misspellings; (4) in response to identifying the particular domain, performing, by one or more processors, a registry lookup for the particular domain to determine a registrant of the particular domain; (5) determining, by one or more processors, based at least in part on the registry information, whether the registrant is associated with the first entity; (6) identifying, by one or more processors, a first link on one or more webpages within the particular web domain; (7) determining, by one or more processors, a target webpage of the first link; (8) determining, by one or more processors, whether the target webpage is associated with an entity other than the first entity; (9) determining, by one or more processors, based at least in part on whether the registrant is associated with the first entity and whether the target webpage is associated with an entity other than the first entity, a level of risk posed by the particular web domain to the first entity; (10) determining, by one or more processors, whether the level of risk exceeds a threshold level of risk; and (11) in response to determining that the level of risk exceeds a threshold level of risk, substantially automatically taking, by one or more processors, a predefined action.

BRIEF DESCRIPTION OF THE DRAWINGS

Various embodiments of a domain scanning and website analysis system are described below. In the course of this description, reference will be made to the accompanying drawings, which are not necessarily drawn to scale, and wherein.

DETAILED DESCRIPTION

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

In particular embodiments, a domain scanning and website analysis system may be utilized to determine whether an entity is registering one or more websites maliciously in the name of a particular organization (e.g., or using a particular brand name, trademark, or other protected name of the organization). A competitor to an organization may, for example, register a domain that includes the organizations name or a brand name under which the organization sells products in order to benefit from the good will of the organizations name or brand. The competitor may then, for example: (1) redirect to their own brand webpages from the domain; (2) disparage or otherwise publish negative information about the organization; (3) etc. A particular organization may risk damage to their reputation by allowing these sorts of domains to continue performing their malicious activity.

In particular embodiments, the domain scanning and website analysis system may be configured to: (1) scan a plurality of top level domain registrations and sub-domains to identify a particular name or variation thereof; (2) perform a registry lookup for any identified top level domains or sub-domains that include the particular name; (3) determine based on registration information determined from the registry lookup, whether the identified domain or sub-domain is registered to a potentially malicious entity; (4) scan one or more webpages in the identified domain to determine content and one or more linked webpages; and (5) determine, based on the determined content, one or more linked webpages, and whether the identified domain or sub-domain is registered to a potentially malicious entity, whether to take action against the identified domain or sub-domain.

In various embodiments, the action may include, for example: (1) generating a report and displaying it to a particular individual to make a determination as to what action to take; (2) automatically generating a take-down notice for the identified domain; and/or (3) any other suitable action. In particular embodiments, the system may be configured to track the reputational risk of a particular entity (e.g., by identifying potential web domains that may sully the reputation of the particular entity).

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

Figure 1:
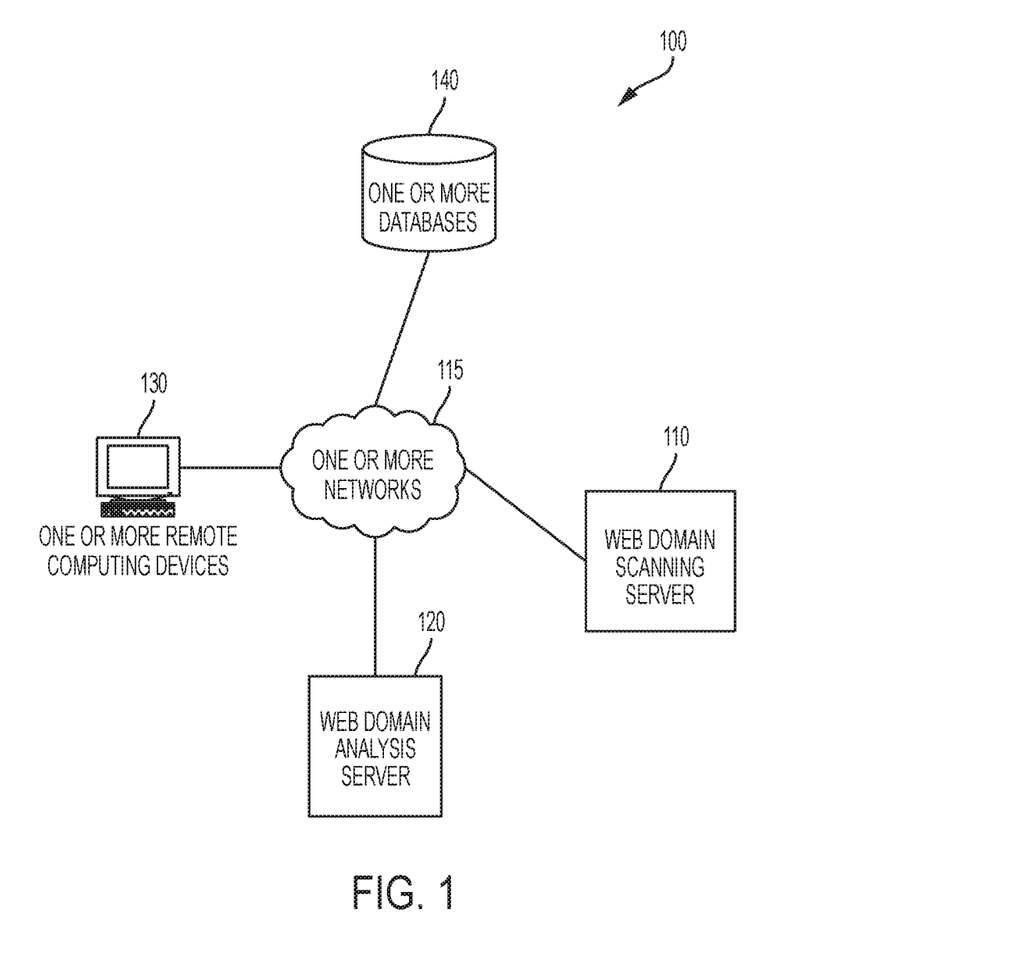
FIG. 1 depicts a domain scanning and website analysis system according to particular embodiments.

FIG. 1 is a block diagram of a Domain Scanning and Website Analysis System 100 according to a particular embodiment. In particular embodiments, the Domain Scanning and Website Analysis System 100 may be implemented in the context of any suitable system, such as a reputational risk monitoring system. In some embodiments, the Domain Scanning and Website Analysis System 100 is configured to scan and analyze a plurality of web domains to determine whether one or more of the web domains may have been registered maliciously.

As may be understood from FIG. 1, the Domain Scanning and Website Analysis System 100 includes one or more computer networks 115, a Web Domain Scanning Server 110, a Web Domain Analysis Server 120, one or more remote computing devices 130 (e.g., a desktop computer, laptop computer, tablet computer, etc.), and One or More Databases 140. In particular embodiments, the one or more computer networks 115 facilitate communication between Web Domain Scanning Server 110, Web Domain Analysis Server 120, one or more remote computing devices 130 (e.g., a desktop computer, laptop computer, tablet computer, etc.), and one or more databases 140.

The one or more computer networks 115 may include any of a variety of types of wired or wireless computer networks such as the Internet, a private intranet, a public switch telephone network (PSTN), or any other type of network. The communication link between the Web Domain Scanning Server 110 and Database 140 may be, for example, implemented via a Local Area Network (LAN) or via the Internet.

Figure 2:
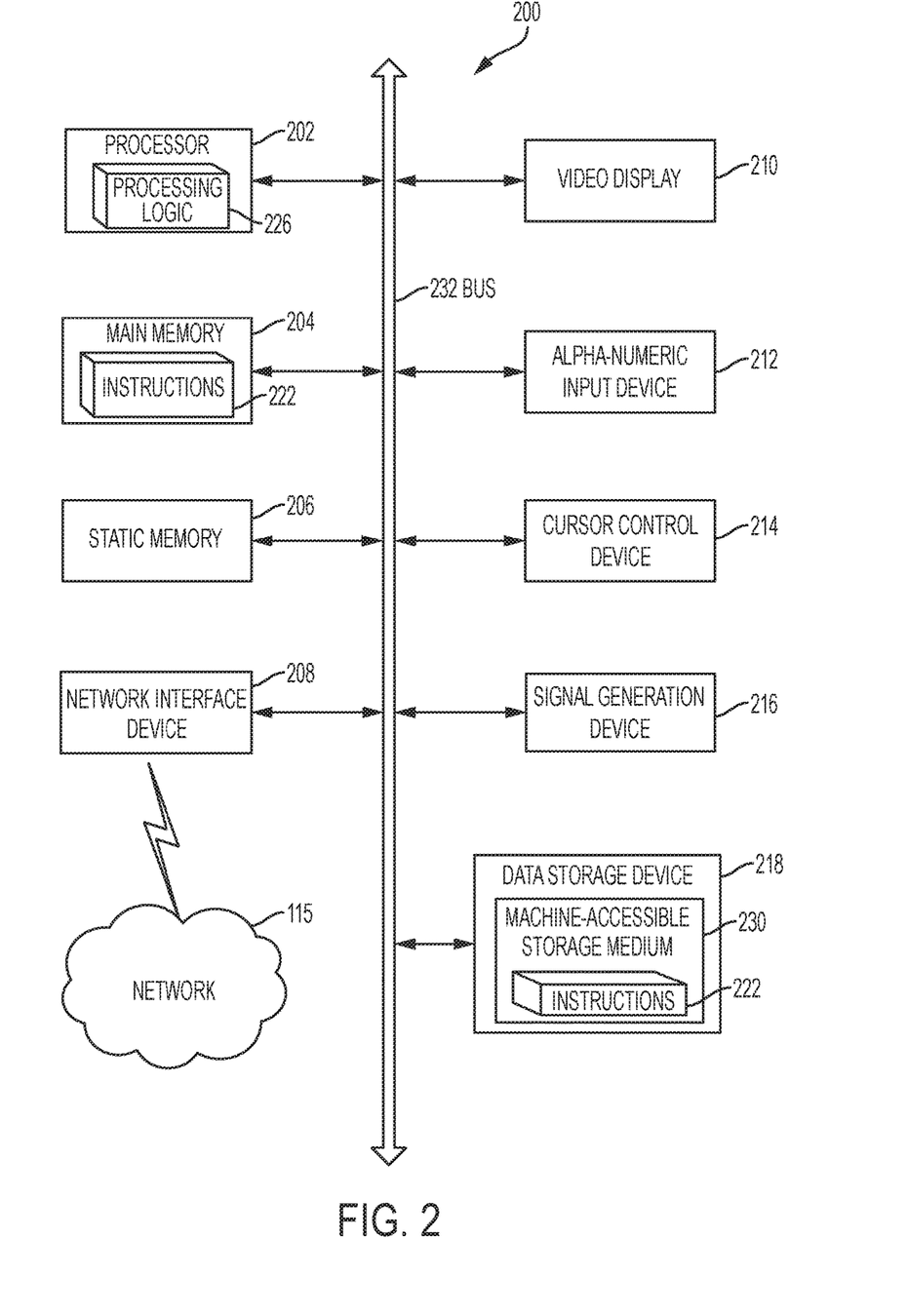
FIG. 2 is a schematic diagram of a computer (such as the Web Domain Scanning Server 110, or one or more remote computing devices 130) that is suitable for use in various embodiments of the domain scanning and website analysis system shown in FIG. 1.

FIG. 2 illustrates a diagrammatic representation of a computer 200 that can be used within the Domain Scanning and Website Analysis System 100, for example, as a client computer (e.g., one or more remote computing devices 130 shown in FIG. 1), or as a server computer (e.g., Web Domain Scanning Server 110 shown in FIG. 1). In particular embodiments, the computer 200 may be suitable for use as a computer within the context of the Domain Scanning and Website Analysis System 100 that is configured to monitor a user's system inputs to ascertain whether any of those inputs are abnormal.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The Computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 200 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software instructions 222) embodying any one or more of the methodologies or functions described herein. The software instructions 222 may also reside, completely or at least partially, within main memory 204 and/or within processing device 202 during execution thereof by computer 200—main memory 204 and processing device 202 also constituting computer-accessible storage media. The software instructions 222 may further be transmitted or received over a network 115 via network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Exemplary System Platform

Figure 3:
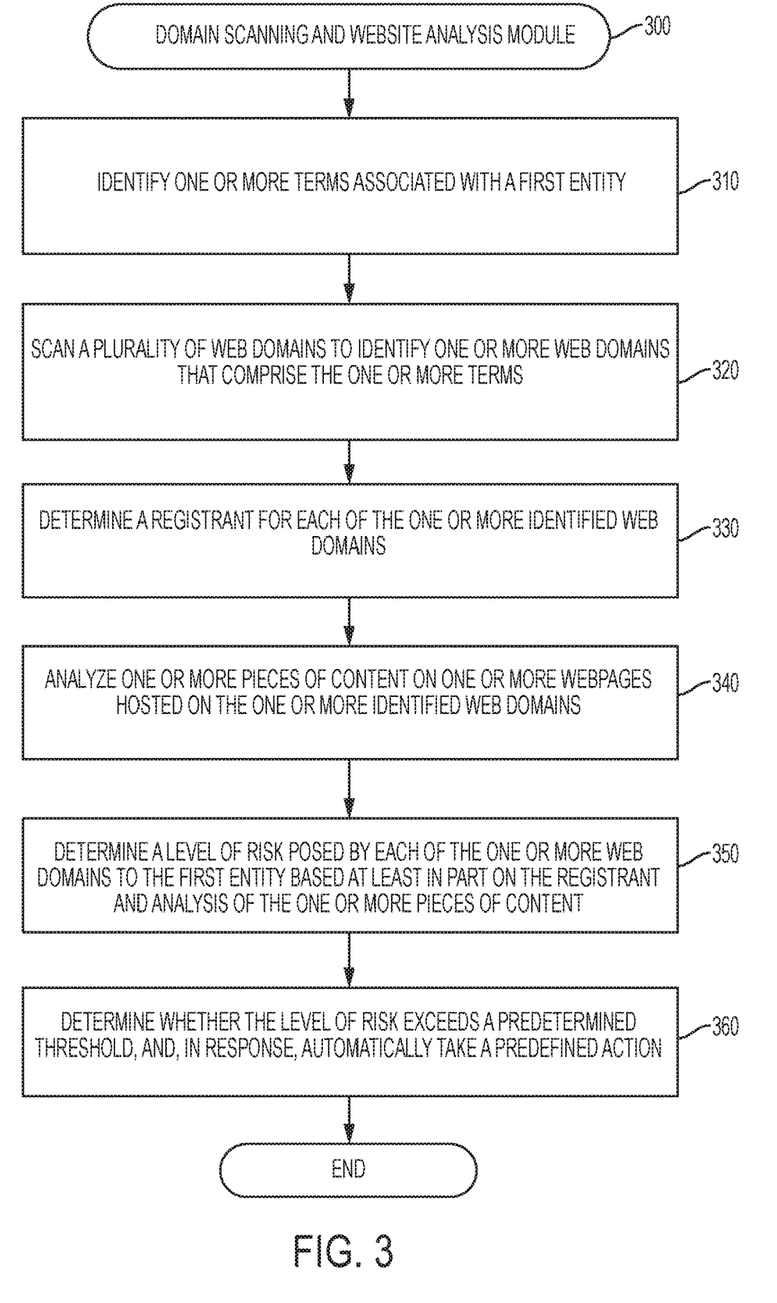
FIG. 3 is a flow chart showing an example of a processes performed by the Domain Scanning and Website Analysis Module according to particular embodiments.

Various embodiments of a web domain scanning and website analysis system may be implemented in the context of any suitable system (e.g., a suitable WebCrawler or suitable system for tracking reputation risk). For example, the domain scanning and website analysis system may be implemented to analyze a plurality of top-level domains and subdomains to determine whether any of the domains may have been maliciously registered. Various aspects of the system's functionality may be executed by certain system modules, including a Domain Scanning and Website Analysis Module 300. This module is discussed in greater detail below. Although this module is presented as a series of steps, it should be understood in light of this disclosure that various embodiments of the Domain Scanning and Website Analysis Module 300 described herein may perform the steps described below in an order other than in which they are presented. In still other embodiments, the Domain Scanning and Website Analysis Module 300 may omit certain steps described below. In various other embodiments, the Domain Scanning and Website Analysis Module 300 may perform steps in addition to those described.

Domain Scanning and Website Analysis Module

In particular embodiments, a Domain Scanning and Website Analysis Module 300 is configured to: (1) search for one or more domains that contain terms relevant to a particular first entity; and (2) determine, based on data associated with the one or more domains, whether the one or more may have been maliciously registered (e.g., may pose at least a partial reputational risk to the first entity).

Turning to FIG. 3, in particular embodiments, when executing the Domain Scanning and Website Analysis Module 300, the system begins, at Step 310, by identifying one or more terms associated with a first entity. In particular embodiments, the first entity may include any suitable corporation, business, brand, individual, or other suitable entity that may desire to determine whether any domains have been registered that contain one or more terms that are (e.g., or may be) of particular interest to the entity.

In various embodiments, the one or more terms may include, for example, one or more terms that have been trademarked or copyrighted by the first entity. The one or more terms may further include any brand name, trade name, catchphrase, tagline, member name, or other suitable term associated with the first entity or name of the first entity itself. As a particular example, Coca-Cola may desire to monitor domains for potentially malicious registrations. In this example, the system may identify a plurality of terms associated with Coca-Cola such as, for example: (1) all of Coca-Cola's registered trademarks; (2) nicknames for Coca-Cola and its products (e.g., Coke); and/or (3) any other suitable name associated with the Coca-Cola company.

In particular embodiments, the system may further identify one or more common misspellings of the one or more terms to include as part of the one or more terms. For example, the system may utilize one or more pieces of software to identify one or more misspellings of any originally identified terms. Continuing the example above regarding Coca-Cola, the system may further identify misspellings of Coca-Cola and related terms such as Coka-Cola, KocaCola, etc.

As may be understood in light of this disclosure, the one or more terms may include any suitable terms that may be relevant to the first entity. Terms that are of relevance to the first entity may include, for example, any terms which the first entity would not want to have exploited or used by a competitor or other individual to take advantage of the first entity's good will. Relevant terms may also include any term that the first entity would not desire to be used when describing or referring to the first entity in a negative light.

Continuing to Step 320, the system scans a plurality of web domains to identify one or more web domains that comprise the one or more terms. In particular embodiments, the system is configured to substantially systematically scan domain names (e.g., top-level domains, subdomains, second-level and lower domains, etc.) to identify the one or more terms. In particular embodiments, the system is configured to use one or more suitable web crawlers to search through and identify domains that comprise the one or more terms. In various embodiments, the system is configured to use one or more suitable web crawlers to scan each of a plurality of top-level domains (e.g., .com, .net, .org, etc.).

In various embodiments, the system, in response to identifying a subdomain comprising the one or more terms, is configured to automatically check a plurality of additional top-level domains to determine whether the subdomain may have been maliciously registered on one or more additional domains. Continuing the Coca-Cola example above, the system may, for example, identify www.koke.com in its search of the .com top-level domain. In response to identifying www.koke.com as a domain (e.g., subdomain) comprising the one or more terms discussed above with respect to Step 310, the system may be configured to search a plurality of additional top-level domains for the 'koke' subdomain (e.g., by searching for www.koke.org, www.koke.net, etc.).

In particular embodiments, the system is configured to initially search a single top-level domain (e.g., '.com') for any subdomains that comprise the one or more terms. The system may then be configured to search additional top-level domains for the same identified subdomains that comprise the one or more terms. In this way, the system may conserve computing resources by limiting an amount of searching to a single top-level domain, and simply checking other top-level domains the subdomains found within the single top-level domain that were found to comprise the one or more terms (e.g., as opposed to performing a comprehensive search of each additional top-level domain). As may be understood by one skilled in the art, because there are over 1,000 top-level domains, there would be a substantially conservation of computing resources by limiting searching to a single (e.g., or a few) top-level domains. In this may, the system may rely on previously identified subdomains as potential targets of malicious registrants on new or less common top-level domains.

In various embodiments, the system is configured to determine that a particular web domain (e.g., top-level domain, subdomain, etc.) comprises the one or more terms in response to determining that the domain at least partially comprises the one or more terms. For example, the system may be configured to determine that the domains www-.pepsi-is-better-than-coke.com or www.coke123.com comprise the term 'coke'. As such, the system may be configured to identify particular domains that include the one or more terms as only a portion of the overall domain name.

In particular embodiments, the system is further configured to store, in computer memory (e.g., in the one or more databases 140 shown in FIG. 1) one or more names of subdomains identified as comprising the one or more terms. In such embodiments, the system may be configured to automatically search any newly identified top-level domains for the stored one or more names of subdomains (e.g., as soon as those new top-level domains are identified).

Continuing to Step 330, the system determines a registrant for each of the one or more identified domains. In particular embodiments, the system is configured to substantially automatically determine the registrant based at least in part on registrant lookup data associated with the domain. The system may, for example, identify the registrant based by performing a 'Who Is' lookup using a suitable 'Who Is' database of web domain registrations.

The system may then be configured to determine whether the listed registrant for the domain is associated with the first entity. The system may, for example, compare the registrant to one or more entity names associated with the first entity (e.g., sub-entities, businesses, etc.). The system may further determine whether the registrant is a blind corporation or holding company associated with the first entity. The system may further determine whether registrations by such registrations would be consistent with policy or practice undertaken by the first entity related to web domain registration. The system may further determine whether the registrant is a law firm or other agent of the first entity.

As may be understood by one skilled in the art, companies, particularly large ones, may register for web domains using a plurality of different related companies. As may be further understood by one skilled in the art, different divisions of a particular company may not necessarily be aware of every web domain registration made by other parts of the company. As such, it may be necessary for the system to make a determination as to whether a particular identified domain is, in fact, associated with the first entity or not (e.g., or is more than likely associated with the first entity).

Continuing to Step 340, the system is configured to analyze one or more pieces of content on one or more webpages hosted on the one or more identified web domains. In particular embodiments, the one or more webpages may include any suitable webpage on the identified domain.

In various embodiments, the one or more pieces of content comprise one or more pieces of text or one or more images on the one or more webpages. For example, in the case of a hate site, the system may identify one or more negative words in association with a name of the first entity or the other one or more terms identified at Step 310 (e.g., 'Coke is poison'). The system may, for example, determine whether a particular negative word (e.g., bad, cheap, gross, etc.) appears on the one or more webpages within a particular number of words of the one or more terms identified at step 310 above (e.g., within one word, within two words, etc.). As may be understood by one skilled in the art, the use of such negative words along with the name of the first entity or the one or more terms identified at step 310 may indicate that the one or more webpages include disparaging information (e.g., potentially defamatory information) about the first entity. Although the domain may be within its legal right to host such information, it may still be in the first entity's interest to be aware of such information.

The system may further analyze the one or more pieces of content to identify whether the website contains information about one or more competitors of the first entity. For example, a domain name of www.drinkcokealways.com may include information about Pepsi or other competing products. The system may analyze one or more image tags for images posted on the one or more webpages, or use any other suitable technique to determine whether the website may be one that may pose a risk to the first entity's reputation. The system, in another example, may analyze the content on the one or more webpages to determine whether the content may be unrelated to the first entity's business interests. Continuing an example from above, the system may determine that a domain that includes the term 'Koke' may be entirely unrelated to soft drinks or soda or anything of the like (e.g., because the domain includes a website about Koke, a professional Spanish soccer player).

In any other embodiment described herein, the system may be configured to analyze one or more pieces of content that include one or more links on the one or more webpages. The system may analyze the one or more links to determine a target website of the one or more links (e.g., to determine whether the target website belongs to a competitor). In various embodiments, the system is configured to determine a registrant of the target website (e.g., a registrant of the target website's domain) and determine whether the registrant is associated with the first entity. As may be appreciated by one skilled in the art, individuals or organizations may maliciously register web domains and redirect web traffic from that domain to a competitor's domain in order to benefit from a particular first entity's good will.

Returning to Step 350, the system determines a level of risk posed by each of the one or more web domains to the first entity (e.g., to the first entity's reputation) based at least in part on the determined registrant and the analysis of the one or more pieces of content. In various embodiments, the system may assign a relatively high risk (e.g., a high risk level) to a domain that cannot be identified as being registered to the first entity. In other embodiments, the system may assign a relatively high risk (e.g., a high risk level) to a domain that redirects to or includes one or more links to a website associated with a competitor of the first entity. In particular embodiments, the system may assign a relatively high risk to a domain that contains one or more hate sites against the first entity.

In particular embodiments, the system is configured to assign a relatively low risk (e.g., a low risk level) to a domain that the system determines at Step 330 is registered to the first entity (e.g., or an organization associated with the first entity). In various embodiments, the system may be configured to assign a relatively low risk (e.g., a low risk level) to a domain that merely includes a placeholder site (e.g., advertising the site for sale), or is otherwise not utilizing the domain for malicious reasons (e.g., as a hate site, etc.).

In various embodiments, the system is configured to assign a risk level based on a percentage (e.g., out of 100%) that takes into account both the registrant and content of a particular domain. In some embodiments, the system may place a higher weight on risk associated with a registrant that is not associated with the first entity.

Next, at Step 360, the system determines whether the level of risk exceeds a predetermined threshold, and, in response to determining that the level of risk exceeds the predetermined threshold, automatically takes a predefined action. In various embodiments, the predetermined threshold may include a particular risk rating (e.g., 50%, 60%, 70%, 80%, or any other suitable risk rating). In other embodiments, the system may utilize a two part test that first determines that the risk does not exceed a threshold in response to determining that the registrant is associated with the first entity. In response to determining that the domain registrant is not associated with the first entity, however, the system may determine whether the level of risk exceeds a particular threshold based on the analysis performed on the content of the one or more webpages associated with the domain performed at Step 340. In particular embodiments, the threshold is received by a user (e.g., a user associated with the first entity). In other embodiments, the system is configured to determine the threshold based on, for example: (1) a number of domains identified at Step 320; (2) a number of the identified domains determined to not have a registrant associated with the first entity; and (3) a number of the identified domains that are determined to potentially be malicious based on the analysis of the domain content.

In response to determining that the level of risk is at least at a level that warrants action, the system is configured to substantially automatically take a predefined action. In particular embodiments, the predefined action may include generating a report of the domains identified as potentially malicious (e.g., the domains having a registrant other than the first entity that contain content determined to be malicious). The system may then be configured to display the report on a suitable computer device, such as any of the one or more remote computing devices 130 shown in FIG. 1. In various embodiments, the system may display the report to any suitable individual associated with the first entity (e.g., a brand manager, etc.).

In other embodiments, the system may generate a report that includes all domains identified as including the one or more terms. In such a report, the system may automatically rank the identified domains in terms of maliciousness (e.g., such that a user reviewing the report can review the most pressing domains first).

In other embodiments, the predefined action may include substantially automatically generating a takedown notice for a particular domain. In various embodiments, the system is further configured to automatically issue the takedown notice and transmit the takedown notice to the identified registrant of the domain. In other embodiments, the system may automatically initiate a domain name dispute (e.g., in accordance with Uniform Domain Name Dispute Resolution Policy propagated by the Internet Corporation for Assigned Names and Numbers).

Exemplary User Experience

Figure 4:
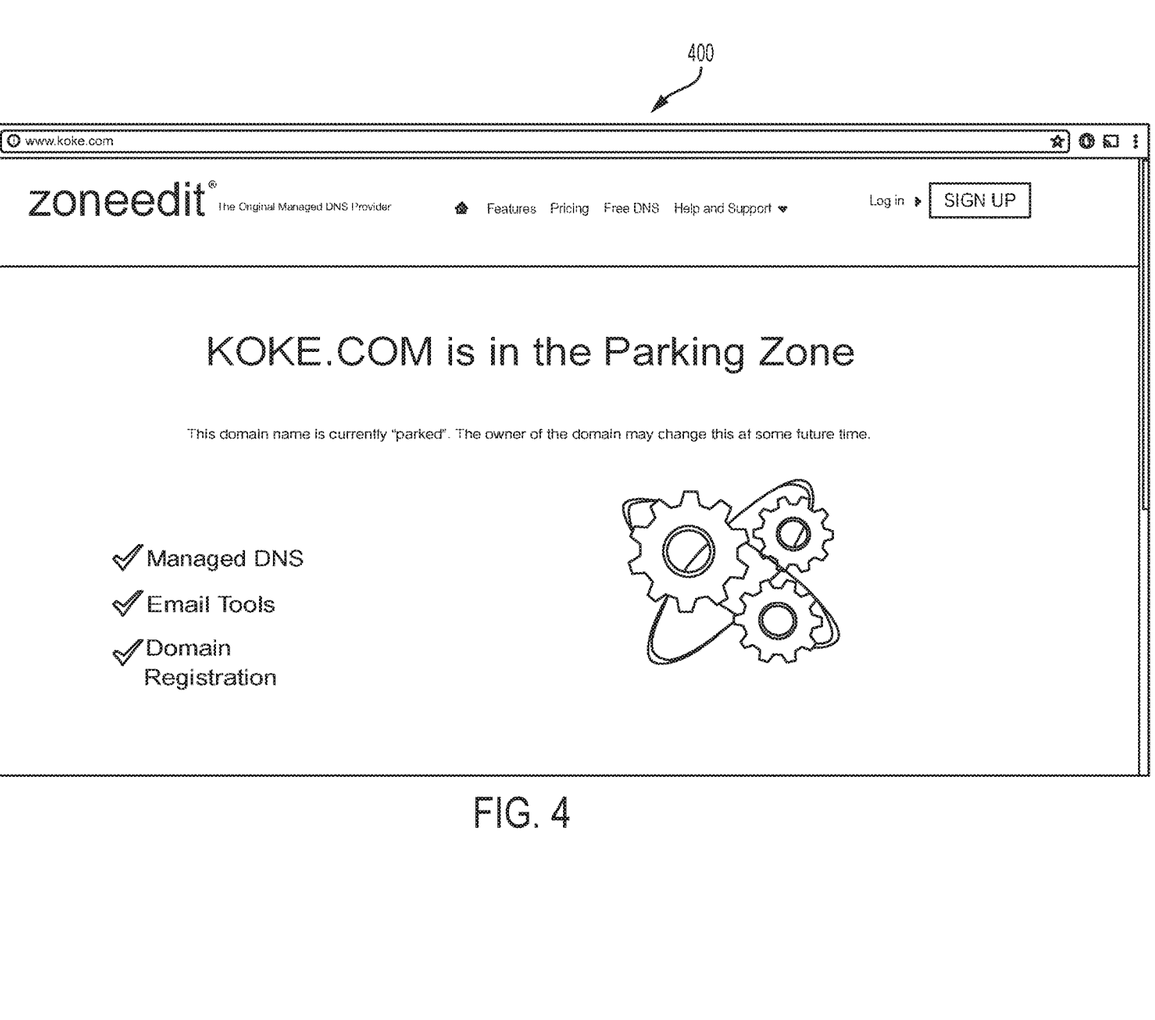
FIGS. 4-5 depict exemplary screen displays and graphical user interfaces (GUIs) according to various embodiments of the system.
Figure 5:
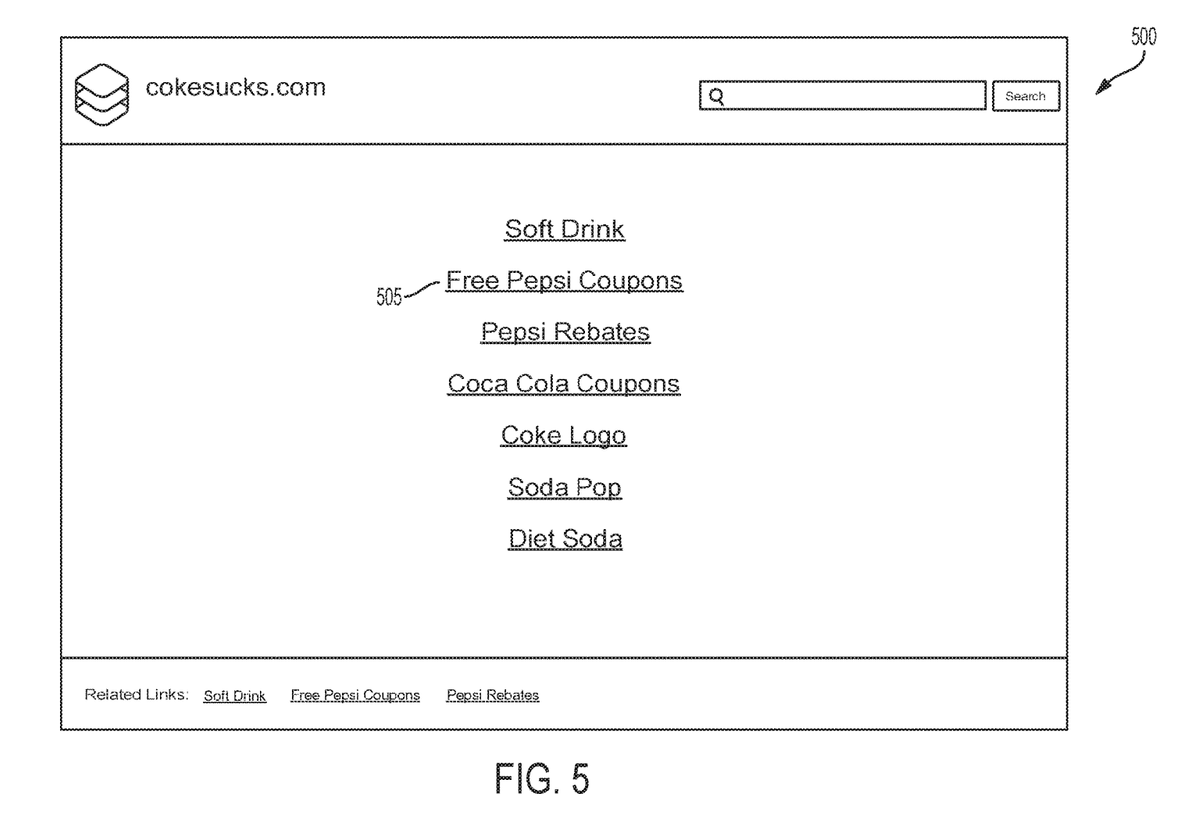

FIGS. 4-5 depict exemplary screen displays to illustrate some of the concepts described herein. FIG. 4 depicts a screen display of a website 400 on the domain koke.com. As may be understood from this figure, the website 400 merely contains a placeholder (e.g., Parking Zone) indicating that the domain is owned, but that the domain is currently parked and contains no content. Various embodiments of the system described herein may identify, using the example above related to Coca-Cola, www.koke.com as containing a term related to Coca-Cola (e.g., as a misspelling of coke). However, further analysis of the content of the domain's website by the system may result in the system determining that the domain presents no risk to Coca-Cola's reputation (e.g., because the content is not hateful or about a competitor) despite the domain potentially being owned by an entity other than Coca-Cola.

FIG. 5 depicts a screen display of a second website 500 on the domain cokesucks.com. In particular embodiments, the system may determine that cokesucks.com contains a term related to a first entity (e.g., Coca-Cola). The system may further determine that the domain is registered to an entity or individual that is unrelated to the first entity. The system may then analyze the content of the website to identify a Free Pepsi Coupons link 505. As may be understood in light of this disclosure, the system may be configured to determine a target website of the link, and determine whether the target website is associated with a competitor. Here, because Pepsi is a competitor of Coca-Cola, the system may determine that the website 500 poses a risk to the first entity's (e.g., Coca-Cola's) reputation. In response to making the determination, the system may notify an individual at Coca-Cola (e.g., a brand manager) of the malicious domain registration located at cokesucks.com.

Alternate Embodiments

Various embodiments of the system described herein may include features in addition to those described. Exemplary alternate embodiments are described below.

Machine Learning of Term and/or Domain Maliciousness

In various embodiments, the system is configured to present a user with a listing of domains that the system has identified as potentially malicious or worth taking action against. In particular embodiments, the system is configured to enable the user to provide input as to whether a particular domain provided by the system is, in fact, problematic. In response to the user's responses the system may be configured to modify a manner in which the system determines that particular domains are worth flagging in the future. For example, in response to a user substantially always (e.g., always) marking flagged domains containing a particular term as not malicious or worth pursuing action against, the system may remove the particular term from the list of one or more terms used to search for domains. In the 'Koke' example described above, the system may automatically remove 'Koke' as a common misspelling of coke in response to at least a particular number of users or instances of rejecting domains including 'Koke' as irrelevant to Coca-Cola's reputational risk.

In various embodiments, the system is configured to identify a particular domain name that one or more users typically identify as not relevant to the first entity and avoid searching for that particular domain in future scans. This may, for example, conserve computing resources on subsequent domain scans by reducing a number of domains searched by the system.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation. Many modifications and other embodiments of the invention will come to mind to one skilled in the art to which this invention pertains having the benefit of the teachings presented in the foregoing descriptions and the associated drawings.

What is claimed is:

1. A computer-implemented data processing method for scanning and analyzing a plurality of web domains, the method comprising:
   determining, by one or more processors, one or more terms associated with the first entity;
   scanning, by the one or more processors, a plurality of web domains to determine whether the plurality of web domains contain one or more domains related to the one or more terms;
   in response to determining that the plurality of web domains contain one or more domains related to the one or more terms, performing, by one or more processors, a registry lookup for the one or more domains to retrieve registry information for each of the one or more domains;
   determining, by the one or more processors, based at least in part on the registry information, whether each of the one or more domains are associated with a first entity;
   in response to determining that a particular domain of the one or more domains is associated with a second entity, rather than the first entity, analyzing, by one or more processors, one or more webpages within the particular domain to determine a level of risk posed by the particular domain to the first entity;
   determining, by the one or more processors, whether the level of risk exceeds a threshold level of risk; and
   in response to determining that the level of risk exceeds a threshold level of risk, determining, by the one or more processors, based at least in part on the registry information of the particular domain of the one or more domains, an identified registrant of the particular domain;
   generating, by the one or more processors, a takedown notice to provide to the identified registrant of the particular domain that is associated with the second entity; and
      automatically transmitting the takedown notice to the identified registrant of the particular domain that is associated with the second entity.

2. The computer-implemented data processing method of claim 1, wherein the predefined action comprises:
   generating, by one or more processors, a report comprising the particular domain and the level of risk; and
   displaying, by one or more processors, the report to an individual associated with the first entity.

3. The computer-implemented data processing method of claim 1, wherein the one or more terms associated with the first entity comprise one or more terms selected from the group consisting of:
   i. one or more brand names associated with the first entity; and
   ii. one or more trademarks associated with the first entity.

4. The computer-implemented data processing method of claim 3, wherein the method further comprises:
   determining, by the one or more processors, one or more common misspellings for the one or more terms; and
   scanning, by the one or more processors, the plurality of web domains to determine whether the plurality of web domains comprise or more domains containing the one or more common misspellings.

5. The computer-implemented data processing method of claim 1, wherein determining whether each of the one or more domains is associated with the first entity comprises determining whether each of the one or more domains are registered to a blind corporation.

6. The computer-implemented data processing method of claim 5, wherein determining whether each of the one or more domains is associated with the first entity further comprises determining whether the first entity is associated with the blind corporation.

7. The computer-implemented data processing method of claim 1, wherein analyzing the one or more webpages within the particular domain to determine a level of risk posed by the particular domain to the first entity comprises analyzing one or more pieces of content on the one or more webpages.

8. The computer-implemented data processing method of claim 1, wherein analyzing the one or more webpages within the particular domain to determine a level of risk posed by the particular domain to the first entity comprises:
  identifying a first link on the one or more webpages;
  determining a target webpage of the first link; and
  determining whether the target webpage is associated with an entity other than the first entity.

9. The computer-implemented data processing method of claim 8, wherein the method comprises determining the level of risk based on whether the target webpage is associated with an entity other than the first entity.

10. The computer-implemented data processing method of claim 9, wherein:
  analyzing the one or more webpages within the particular domain to determine a level of risk posed by the particular domain to the first entity comprises analyzing one or more pieces of content on the one or more webpages; and
  the step of determining a level of risk posed by the particular domain to the first entity comprises determining the level of risk based, at least in part, on the analyzed one or more pieces of content.

11. The computer-implemented data-processing method of claim 1, wherein:
  analyzing the one or more webpages within the particular domain comprises analyzing one or more pieces of content on the one or more webpages within the particular web domain;
  analyzing one or more pieces of content on the one or more webpages within the particular web domain comprises:
    identifying one or more pieces of text within the one or more webpages; and
    determining whether the one or more pieces of text comprise one or more negative words associated with the one or more terms; and
  determining the level of risk posed by the particular domain to the first entity comprises determining the level of risk based on whether the one or more pieces of text comprise one or more negative words associated with the one or more terms.

12. The computer-implemented data-processing method of claim 1, wherein:
  analyzing the one or more webpages within the particular domain comprises analyzing one or more pieces of content on the one or more webpages within the particular web domain;
  the one or more pieces of content comprise a first link; and
  analyzing the one or more pieces of content on the one or more webpages within the particular web domain comprises:
    determining a target website of the first link;
    determining a target website registrant of the first link; and
    determining whether the target website registrant is a competitor of the first entity; and
  determining the level of risk posed by the particular domain to the first entity comprises determining the level of risk based on whether the target website registrant is a competitor of the first entity.

13. The computer-implemented data-processing method of claim 12, wherein:
  the one or more pieces of content comprise a second link; and
  analyzing the one or more pieces of content on the one or more webpages within the particular web domain comprises determining whether a first target website of the second link redirects to a second target website; and
  determining a level of risk posed by the particular domain to the first entity comprises determining the level of risk based on whether the first target website of the second link redirects to a second target website.

14. The computer-implemented data-processing method of claim 1, wherein:
  the scanning step is a first scanning step that comprises scanning a plurality of subdomains within a particular top-level domain;
  the particular domain of the one or more domains is a subdomain of the particular top-level domain; and
  the method further comprises performing a second scan of a second particular top-level domain for the subdomain.

15. The computer-implemented data-processing method of claim 1, wherein:
  the scanning step is a first scanning step;
  the method comprises performing a second scan, by the one or more processors, of the plurality of web domains and a plurality of subdomains to the plurality of web domains to identify a second particular web domain of the plurality of web domains plurality of subdomains that comprises the one or more terms, wherein: the second scan occurs at a time after the first scanning step.

16. A computer-implemented data-processing method of analyzing a risk level of a particular web domain to a first entity, the method comprising:
  determining, by one or more processors, one or more terms associated with the first entity;
  determining, by the one or more processors, one or more common misspellings of the one or more terms;
  scanning, by the one or more processors, a plurality of web domains to identify a particular web domain of the plurality of web domains that comprises the one or more terms or the one or more common misspellings;
  in response to identifying the particular domain, performing, by one or more processors, a registry lookup for the particular domain to determine a registrant of the particular domain;
  determining, the by one or more processors, based at least in part on the registry information, whether the registrant is associated with the first entity;
  identifying, by the one or more processors, a first link on one or more webpages within the particular web domain;
  determining, by the one or more processors, a target webpage of the first link;

determining, by the one or more processors, whether the target webpage is associated with an entity other than the first entity;

determining, by the one or more processors, based at least in part on whether the registrant is associated with the first entity and whether the target webpage is associated with an entity other than the first entity, a level of risk posed by the particular web domain to the first entity;

determining, by the one or more processors, whether the level of risk exceeds a threshold level of risk; and in response to determining that the level of risk exceeds a threshold level of risk, determining, by the one or more processors, based at least in part on the registry information of the particular domain of the one or more domains, an identified registrant of the particular domain;

generating, by the one or more processors, a takedown notice to provide to the identified registrant of the particular domain that is associated with the second entity; and automatically transmitting the takedown notice to the identified registrant of the particular domain that is associated with the second entity.

17. The computer-implemented data-processing method of claim 16, wherein determining, whether the target webpage is associated with an entity other than the first entity comprises analyzing the content of the target webpage to determine whether the content comprises content associated with a competitor of the first entity.

18. The computer-implemented data-processing method of claim 17, wherein determining whether the target webpage is associated with an entity other than the first entity further comprises:

determining a host domain of the target webpage; and determining whether the host domain is registered by an entity associated with the first entity.

19. The computer-implemented data-processing method of claim 18, wherein the predefined action is selected from a group consisting of:

i. generating a report comprising the particular domain and the level of risk, and displaying the report to an individual associated with the first entity; and ii. substantially automatically generating and issuing a takedown notice for the particular domain; and automatically transmitting the takedown notice to the second entity.

* * * * *